(12) United States Patent
Luo

(10) Patent No.: US 12,145,059 B2
(45) Date of Patent: Nov. 19, 2024

(54) GAME SPECIAL EFFECT GENERATION METHOD AND APPARATUS, AND STORAGE MEDIUM AND ELECTRONIC DEVICE

(71) Applicant: NETEASE (HANGZHOU) NETWORK CO., LTD., Zhejiang (CN)

(72) Inventor: Shengzhou Luo, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 244 days.

(21) Appl. No.: 17/759,023

(22) PCT Filed: Mar. 17, 2020

(86) PCT No.: PCT/CN2020/079770
§ 371 (c)(1),
(2) Date: Jul. 18, 2022

(87) PCT Pub. No.: WO2021/147157
PCT Pub. Date: Jul. 29, 2021

(65) Prior Publication Data
US 2023/0032417 A1    Feb. 2, 2023

(30) Foreign Application Priority Data

Jan. 20, 2020   (CN) .......................... 202010063838.0

(51) Int. Cl.
*A63F 13/52* (2014.01)
*A63F 13/424* (2014.01)
*A63F 13/54* (2014.01)

(52) U.S. Cl.
CPC ............ *A63F 13/52* (2014.09); *A63F 13/424* (2014.09); *A63F 13/54* (2014.09); *A63F 2300/6692* (2013.01)

(58) Field of Classification Search
CPC ......... A63F 13/52; A63F 13/54; A63F 13/424
See application file for complete search history.

(56) References Cited

U.S. PATENT DOCUMENTS

| | | | |
|---|---|---|---|
| 2018/0256979 A1* | 9/2018 | Kunieda | ................. A63F 13/47 |
| 2019/0130654 A1* | 5/2019 | Bastide | ............... G06F 3/04817 |

(Continued)

FOREIGN PATENT DOCUMENTS

| | | |
|---|---|---|
| CN | 1170924 A | 1/1998 |
| CN | 1589568 A | 3/2005 |

(Continued)

OTHER PUBLICATIONS

International Search Report dated Oct. 23, 2020 of PCT International Application No. PCT/CN2020/079770.

(Continued)

*Primary Examiner* — Jay Trent Liddle
(74) *Attorney, Agent, or Firm* — Qinghong Xu

(57) ABSTRACT

Disclosed are a game special effect generation method and apparatus, and a storage medium and an electronic device, which belong to the technical field of game development. The method comprises: in response to a game running event, acquiring a picture file or a video file (S110), wherein sound spectrum information is stored in a color channel of the picture file or the video file; reading the sound spectrum information in the picture file or the video file (S120); and generating a special effect animation in a game according to the sound spectrum information (S130).

19 Claims, 10 Drawing Sheets

(56) References Cited

U.S. PATENT DOCUMENTS

2019/0358527 A1* 11/2019 Nozaki ............... A63F 13/5255
2020/0289926 A1*  9/2020 Silverstein ............ A63F 13/217

FOREIGN PATENT DOCUMENTS

| | | |
|---|---|---|
| CN | 104346147 A | 2/2015 |
| CN | 105396289 A | 3/2016 |
| CN | 105810226 A | 7/2016 |
| CN | 107195310 A | 9/2017 |
| CN | 107329980 A | 11/2017 |
| CN | 107967706 A | 4/2018 |
| CN | 108712671 A | 10/2018 |
| CN | 108771861 A | 11/2018 |
| CN | 109120983 A | 1/2019 |
| CN | 110390942 A | 10/2019 |
| JP | 2002159661 A | 6/2002 |
| WO | 2019047818 A1 | 3/2019 |

OTHER PUBLICATIONS

First Office Action dated Nov. 3, 2020 of Chinese Patent No. 202010063838.0.
Notice of Allowance dated Jan. 13, 2021 of Chinese Patent No. 202010063838.0.

\* cited by examiner

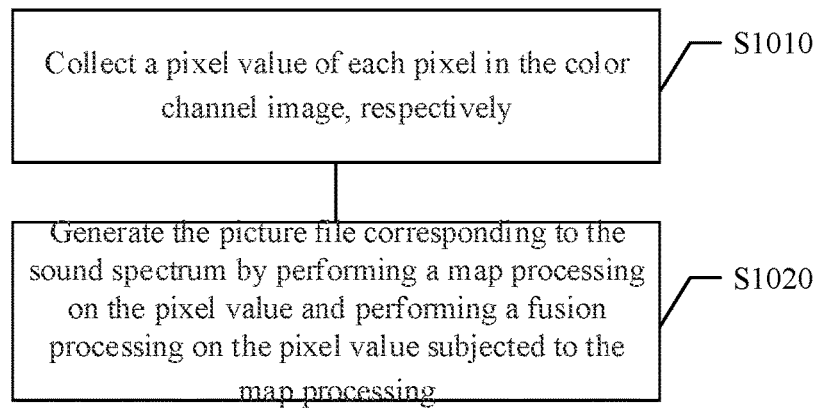
FIG. 10
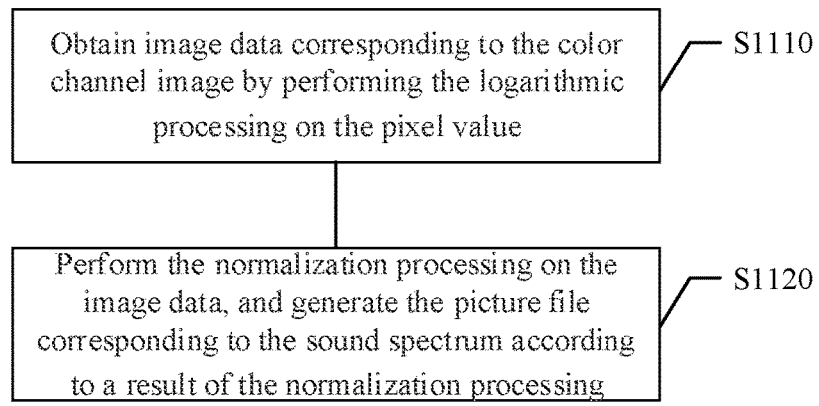
FIG. 11
FIG. 12

GAME SPECIAL EFFECT GENERATION METHOD AND APPARATUS, AND STORAGE MEDIUM AND ELECTRONIC DEVICE

CROSS-REFERENCE TO RELATED APPLICATIONS

This application is a U.S. national stage of International Application No. PCT/CN2020/079770, filed Mar. 17, 2020, the disclosure of which is hereby incorporated by reference in its entirety.

TECHNICAL FIELD

The present disclosure relates to the technical field of game development, and in particular to a method for generating a game special effect, a device for generating a game special effect, a computer-readable storage medium, and an electronic device.

BACKGROUND

With the development of various mobile devices such as mobile phones, content of games on mobile platforms has become increasing abundant. Game visual elements that change with music are usually used in games to express more colorful game effects. A game application is used to decode an audio file to read intensity information of the music, and the Fourier transform is used to convert time domain information into frequency domain information to present music waveform spectrum.

It should be noted that the information disclosed in the background section above is only used to enhance the understanding of the background of the present disclosure, and therefore may include information that does not constitute the prior art known to those skilled in the art.

SUMMARY

The present disclosure provides a method and device for generating a game special effect, a computer-readable storage medium, and an electronic device.

Other characteristics and advantages of the present disclosure will become apparent through the following detailed description, or partly learned through the practice of the present disclosure.

According to an aspect of the present disclosure, there is provided a method for generating a game special effect, and the method includes: acquiring a picture file or a video file in response to a game running event, where sound spectrum information is stored in a color channel of the picture file or the video file; reading the sound spectrum information in the picture file or the video file; and generating a special effect animation in the game according to the sound spectrum information.

According to an aspect of the present disclosure, there is provided a device for generating a game special effect, and the device includes: a processor; and a memory for storing instructions executable by the processor; the processor is arranged to execute operation of: acquiring a picture file or a video file in response to a game running event, where sound spectrum information is stored in a color channel of the picture file or the video file; reading the sound spectrum information in the picture file or the video file; and generating a special effect animation in the game according to the sound spectrum information.

According to an aspect of the present disclosure, there is provided a computer-readable storage medium having a computer program stored thereon, that, when executed by a processor, implements the method for generating a game special effect of any of the foregoing exemplary embodiments.

It should be understood that the above general description and the following detailed description are merely exemplary and explanatory, and should not limit the present disclosure.

BRIEF DESCRIPTION OF THE DRAWINGS

FIG. 10 schematically shows a schematic flowchart of a method for generating a picture file according to some embodiments of the present disclosure;

FIG. 11 schematically shows a schematic flowchart of a method for further generating a picture file according to some embodiments of the present disclosure;

FIG. 12 schematically shows a generated picture file in a format that supports opacity according to some embodiments of the present disclosure;

DETAILED DESCRIPTION

Figure 1:
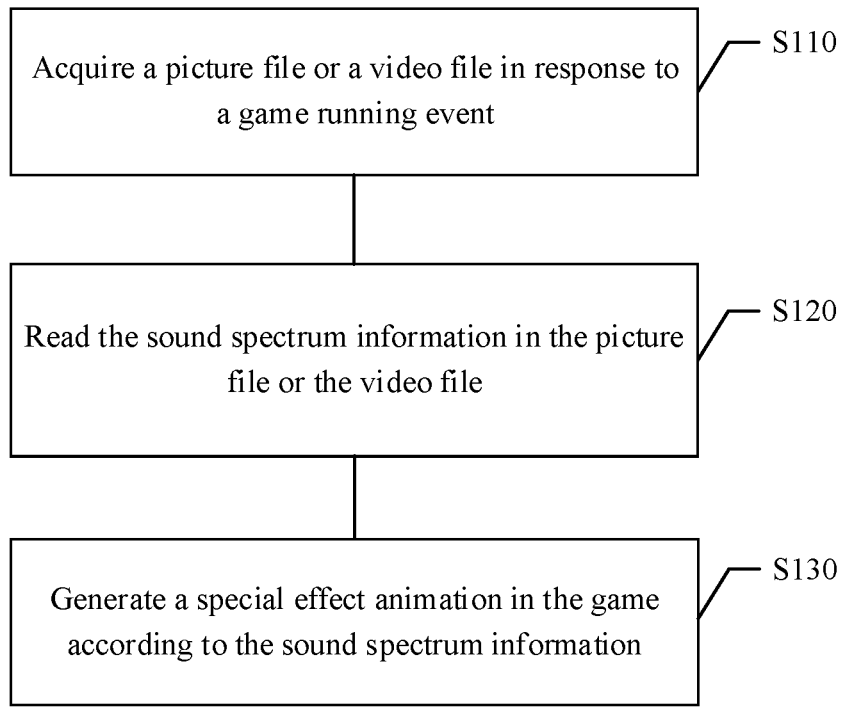
FIG. 1 schematically shows a flowchart of a method for generating a game special effect according to some embodiments of the present disclosure.

Example embodiments will now be described more fully with reference to the accompanying drawings. However, the embodiments may be implemented in various forms and should not be construed as limited to the examples set forth herein; rather, providing these embodiments makes the present disclosure more comprehensive and complete, and conveys the concepts of the embodiments comprehensively to those skilled in the art. The features, structures, or characteristics described above may be combined in any suitable manner in one or more embodiments. In the description below, numerous specific details are set forth to provide a thorough understanding of the embodiments of the present disclosure. However, those skilled in the art will appreciate that the technical solution of the present disclosure may be practiced without one or more of the specific details, or other methods, components, devices, steps and the like may be employed. In other instances, well-known technical solutions are not shown or described in detail to avoid obscuring various aspects of the present disclosure.

In the present specification, the terms "one", "a", "the", and "said" are used to indicate that there are one or more elements/components or the like; the terms "include", "contain" and "have" are used to indicate an open meaning of including and means that there may be additional elements/components/etc. in addition to the listed elements/components/etc.; the terms "first" and "second" etc. are used only as markers, and do not limit the number of objects.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities.

In view of the problems in the related art, the present disclosure proposes a method for generating a game special effect. FIG. 1 is a flowchart of a method for generating a game special effect, and as shown in FIG. 1, the method for generating a game special effect includes at least the following steps:

in step S110, a picture file or a video file is acquired in response to a game running event, and sound spectrum information is stored in a color channel of the picture file or the video file;

in step S120, the sound spectrum information in the picture file or the video file is read; and in step S130, a special effect animation in the game is generated according to the sound spectrum information.

In some embodiments of the present disclosure, the special effect animation in the game may be generated based on the sound spectrum information read from the picture file or the video file. On one hand, a limitation that audio data cannot be analyzed and calculated in a mobile platform in real time to obtain the sound spectrum information, is solved, thereby achieving the object of accurately extracting the sound spectrum information while ensuring integrity of the audio data. On the other hand, the sound spectrum information is used to generate special effects in the games, thereby enriching application scenarios of sound spectrum information and rendering more detailed and diverse three-dimensional special effect animations.

Steps of the method for generating a game special effect are described in detail below.

In step S110, the picture file or the video file is acquired in response to the game running event, and the sound spectrum information is stored in the color channel of the picture file or the video file.

In some embodiments of the present disclosure, the game running event may be a response event for generating a special effect animation in the game. In response to the game running event, a picture file or video file that has been generated is acquired.

Figure 2:
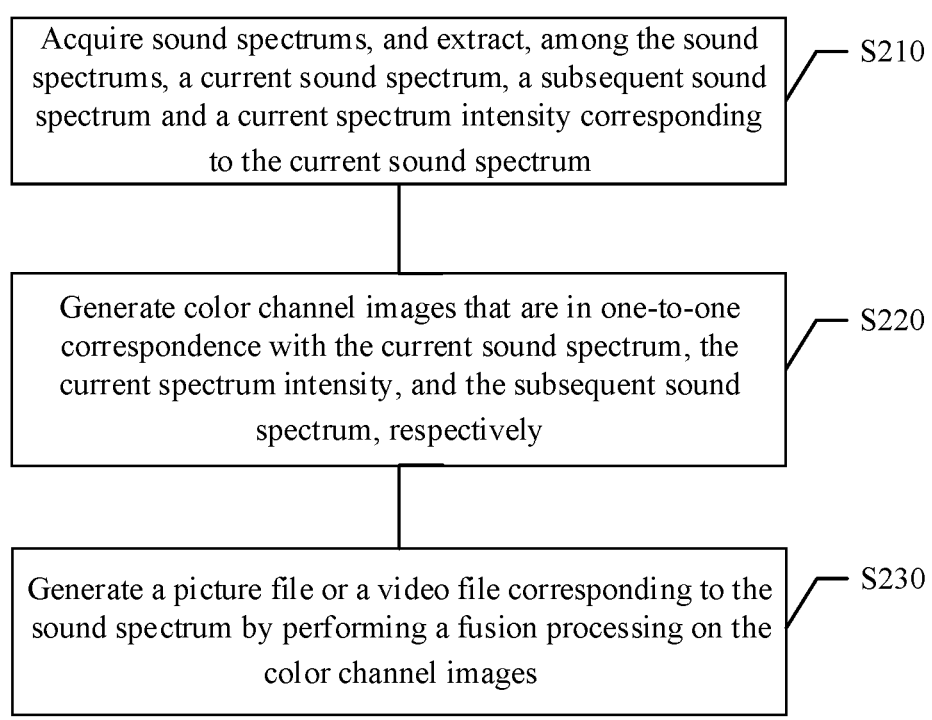
FIG. 2 schematically shows a schematic flowchart of a method for generating a picture file or a video file according to some embodiments of the present disclosure.

In some embodiments, FIG. 2 shows a schematic flowchart of a method for generating a picture file or a video file. As shown in FIG. 2, the method includes at least steps described below. In step S210, sound spectrums are acquired, and a current sound spectrum, a subsequent sound spectrum and a current spectrum intensity corresponding to the current sound spectrum are extracted from the sound spectrums.

Figure 3:
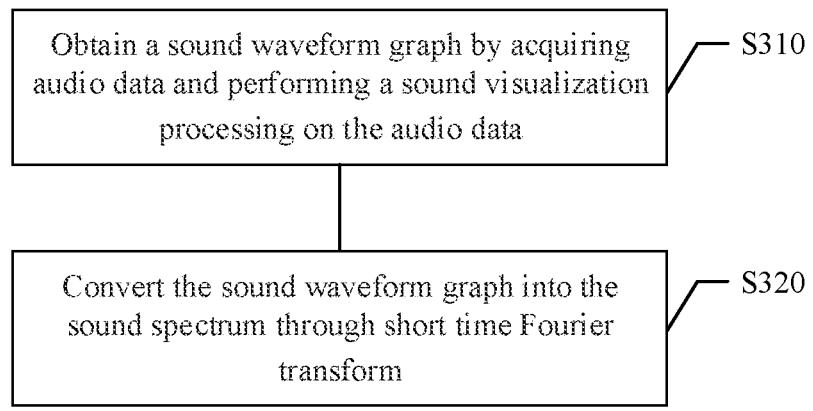
FIG. 3 schematically shows a schematic flowchart of a method for acquiring a sound spectrum according to some embodiments of the present disclosure.

In some embodiments, FIG. 3 shows a schematic flowchart of a method for acquiring sound spectrums. As shown in FIG. 3, the method includes at least the following step: in step S310, audio data is acquired, and a sound visualization processing is performed on the audio data to obtain a sound waveform graph. The audio data may be in any audio format, such as an audio compression format of MPEG-1 (MPEG-1 Audio Layer3, MP3 for short), or wave audio files (WAV for short). The sound visualization processing on the obtained audio data may be implemented by a game engine, such as Unity. The game engine Unity decodes the audio data to obtain the sound waveform, which realizes a function of converting an analog signal into a digital signal.

Figure 4:
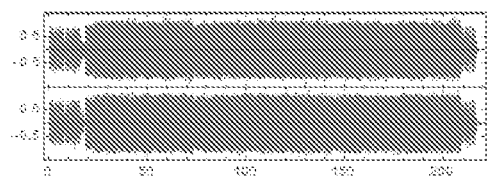
FIG. 4 schematically shows a sound waveform graph obtained according to stereo in some embodiments of the present disclosure.

FIG. 4 shows a sound waveform graph obtained from stereo. As shown in FIG. 4, the sound waveform graph is the waveform of a section of stereo, thus there are two audio tracks. These two tracks identify changes of sound over time, where the horizontal axis (X axis) represents time, and the vertical axis (Y axis) represents a fluctuation signal of the audio, that is, vibration amplitude of the sound.

In step S320, the sound waveform graph is converted into the sound spectrum through short time Fourier transform. The Fourier transform is a manner of analyzing a signal. During the signal processing, the Fourier transform is used to decompose the signal into an amplitude spectrum, thereby showing the amplitude corresponding to the frequency. The short time Fourier transform is a mathematical transform related to the Fourier transform, and is used for determining a frequency and phase of a sine wave in a local area of a time-varying signal. To put it simply, in the short time Fourier transform, a signal is divided into small segments by windowing the audio data (time-domain signal) to be identified in the time domain, and then the Fourier transform is performed on each segment of the signal. The short time Fourier transform uses a fixed window function to divide the audio data to be identified that changes over time into n windows, and the number of windows may be adjusted according to a length of time of the audio data. The longer the time, the more windows. It is better for the window to be short as far as possible, so that a frequency of the signal in the window keeps approximately unchanged.

Figure 5:
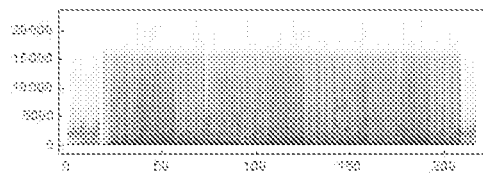
FIG. 5 schematically shows a spectrogram of a sound spectrum obtained according to a sound waveform graph in some embodiments of the present disclosure.

FIG. 5 shows a spectrogram of a sound spectrum obtained from a sound waveform graph. As shown in FIG. 5, a column in the spectrogram is converted from the sound waveform in the window function of FIG. 4, and a size of the window function may be 1024 or 2048, which is not particularly limited in the embodiments. In the spectrogram, the horizontal axis (X axis) represents time and the vertical axis (Y axis) represents frequency.

In some embodiments, the corresponding sound spectrum may be acquired from the audio data, and the processing method is simple and easy to operate, and a quality of the sound spectrum obtained is high, thus ensuring a generation effect of the game special effect.

After the sound spectrum is obtained, sound spectrum information may be extracted from the sound spectrum, and the sound spectrum information is to be saved in the color channel of the picture file or the video file. The sound spectrum information includes the current sound spectrum, the current spectrum intensity, and the subsequent sound spectrum.

Specifically, since one frame in the spectrogram of the sound spectrum is a two-dimensional graph which represents an intensity of the sound at different frequencies, the current sound spectrum represents a sound spectrum extracted at one time point. For example, in FIG. 5, a sound spectrum of 0 to 219 seconds is shown, and there are 30 or 60 frames of spectrum within 1 second. Therefore, a sound spectrum of one frame may be extracted as the current sound spectrum.

The current spectrum intensity represents an average intensity of the current sound spectrum, that is, an average intensity value of the current sound spectrum at respective frequencies. Selected frequencies may be 1000 HZ, 2000 HZ, 4000 HZ, etc., or other frequencies, which is not particularly limited in this exemplary embodiment.

The subsequent sound spectrum may be a sound spectrum obtained to be apart from the current sound spectrum by 64 frames. The subsequent sound spectrum may ensure the patchwork and layered effects in the special effect animation.

Figure 6:
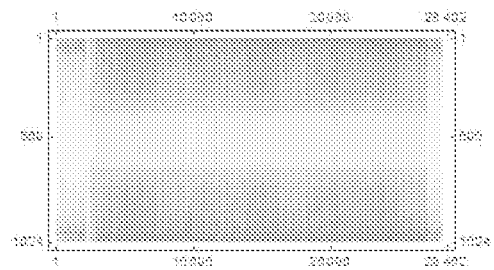
FIG. 6 schematically shows a generated color channel image of a current sound spectrum according to some embodiments of the present disclosure.

In step S220, color channel images in one-to-one correspondence with the current sound spectrum, the current spectrum intensity, and the subsequent sound spectrum are generated, respectively. FIG. 6 shows a generated color channel image of a current sound spectrum. As shown in FIG. 6, the color channel image may be saved in an R channel. One column of pixels represents one sound spectrum, and one row of pixels represents a value change of one spectrum in an entire audio time period. The X-axis represents the number of the spectrum, that is, a sampling data point of the spectrogram, and the Y-axis represents a frequency distribution, and since the window function of the short time Fourier is 1024, a width of the current sound spectrum is 1024.

Figure 7:
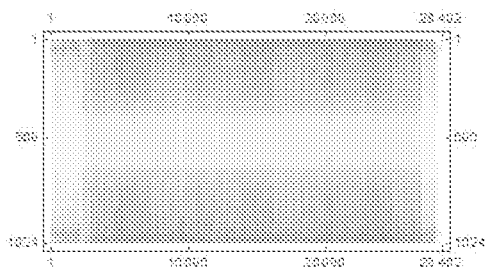
FIG. 7 schematically shows a generated color channel image of a current spectrum intensity according to some embodiments of the present disclosure.

FIG. 7 shows a generated color channel image of a current spectrum intensity. As shown in FIG. 7, each pixel value represents an average value of the sound spectrum. The color channel image may be saved in a B channel. One column of pixels represents one sound spectrum, and one row of pixels represents a value change of one spectrum in an entire audio time period. The horizontal axis (X-axis) represents the number of the spectrum, that is, a data sampling point of the spectrogram, and the vertical axis (Y-axis) represents a frequency distribution. Moreover, since the window function of the short time Fourier is 1024, a width of the current sound spectrum is 1024.

Figure 8:
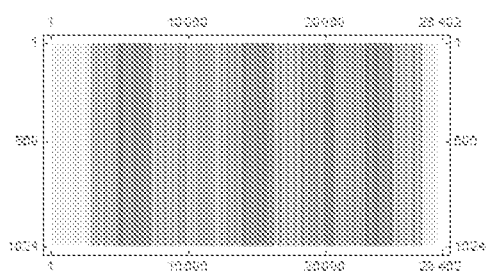
FIG. 8 schematically shows a generated color channel image of a subsequent sound spectrum according to some embodiments of the present disclosure.

FIG. 8 shows a generated color channel image of a subsequent sound spectrum. As shown in FIG. 8, the subsequent sound spectrum is obtained by shifting the data sampling points to the left by 64 pixels from the current sound spectrum. The color channel image may be saved in a G channel. One column of pixels represents one sound spectrum, and one row of pixels represents a value change of one spectrum in an entire audio time period. Further, for performance considerations, a spectrogram width of the subsequent sound spectrum may be further compressed to 64 pixels, and a moving window for the sampled image in the game may also be 64 pixels*64 pixels, which is more convenient for game sampling.

In addition, sound fluctuation information may also be collected from the sound spectrum, and a color channel image for storing the sound fluctuation information is generated.

In some embodiments, the sound fluctuation information corresponding to the current sound spectrum is extracted at a preset time interval, and the color channel image corresponding to the sound fluctuation information is generated. The sound fluctuation information represents fluctuation of a certain frequency within a period since the current sound spectrum is extracted, that is, a moving standard deviation of multiple spectrums at a certain frequency during this period of time is calculated. For example, the moving standard deviation at a frequency of 1000 Hz of the spectrum during the preset time interval of 10 seconds (for example, between 50 seconds and 60 seconds) is calculated, and the calculation result is the sound fluctuation information.

Figure 9:
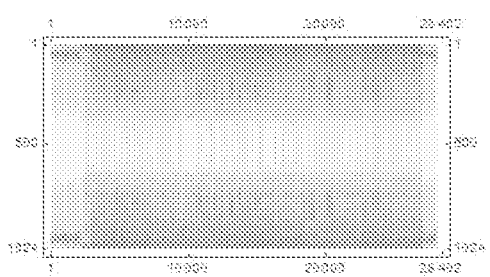
FIG. 9 schematically shows a generated color channel image of sound fluctuation information according to some embodiments of the present disclosure.

FIG. 9 shows a generated color channel image of the sound fluctuation information. As shown in FIG. 9, each pixel represents a moving standard deviation of the frequency in the subsequent sixty-four spectrums, that is, a moving standard deviation of horizontal sixty-four pixels from this pixel. The color channel image may be saved in the A channel, which is the opacity channel. One column of pixels represents one sound spectrum, and one row of pixels represents a value change of one spectrum in an entire audio time period.

In step S230, a fusion processing is performed on the color channel image to generate a picture file or a video file corresponding to the sound spectrum.

In some embodiments, FIG. 10 shows a schematic flowchart of a method for generating a picture file. As shown in FIG. 10, the method includes at least steps described below. In step S1010, a pixel value of each pixel in the color channel image is collected, respectively. For the obtained four color channel images of the R, G, B, and A channels, sampling may be performed at each pixel respectively to obtain the pixel value of each pixel in the four color channel images.

In step S1020, a map processing is performed on the pixel value, and a fusion processing is performed on the pixel value subjected to the map processing to generate the picture file corresponding to the sound spectrum.

In some embodiments, the map processing includes a logarithmic processing and a normalization processing. FIG. 11 further shows a schematic flowchart of a method for generating a picture file. As shown in FIG. 11, the method includes at least the following steps: in step S1110, the logarithmic processing is performed on the pixel value to obtain image data corresponding to the color channel image. A variation range of the pixel values collected from the color channel image may be relatively large, so the sound spectrum information is subjected to the map processing before being saved. In practice, the sound frequency may be distributed between 1-1400, but it is mainly concentrated in a low frequency area. The map processing performed on the sound frequency may not only save variation, but also concentrate it between 0-1. The logarithmic processing means taking a logarithm of a calculation result related to the minimum or maximum value in the color channel image.

In step S1120, the normalization processing is performed on the image data, and the picture file corresponding to the sound spectrum is generated according to a result of the normalization processing. The normalization process is to compress the image data to between 0 and 1. Specifically, the logarithmic result may be further normalized by formula 1:

$$Y = \frac{\log_e(X - \min(X) + 1)}{\max(\log_e(X - \min(X) + 1))} \quad \text{Formula 1}$$

where, min(X) represents a minimum value among the pixel values, and max(X) represents a maximum value among the pixel values. Therefore, the result of the normalization process may be obtained, and the result may be determined as the picture file.

In some embodiments, the picture file includes a picture file in a format that supports opacity. Because an opaque channel is used to save the sound fluctuation information, the saved picture file must be a file in a format that supports the opacity. For example, the file format may be a portable network graphics (PNG for short), or a picture file in another format that supports the opacity, which is not particularly limited in the embodiments.

FIG. 12 shows a generated picture file in a format that supports opacity. As shown in FIG. 12, the sound spectrum of the audio data is compressed and stored in a long strip of picture.

In this exemplary embodiment, a method for generating a picture file is given, the picture file not only may reflect the fluctuations and changes of the sound, but also the analysis and calculation of the sound spectrum may be realized through the picture file, which is conducive to rendering delicate and rich games special effects.

In addition to the method for extracting sound spectrum information for generating the picture file, there may also be a method for extracting sound spectrum information for a video file to be generated.

Figure 13:
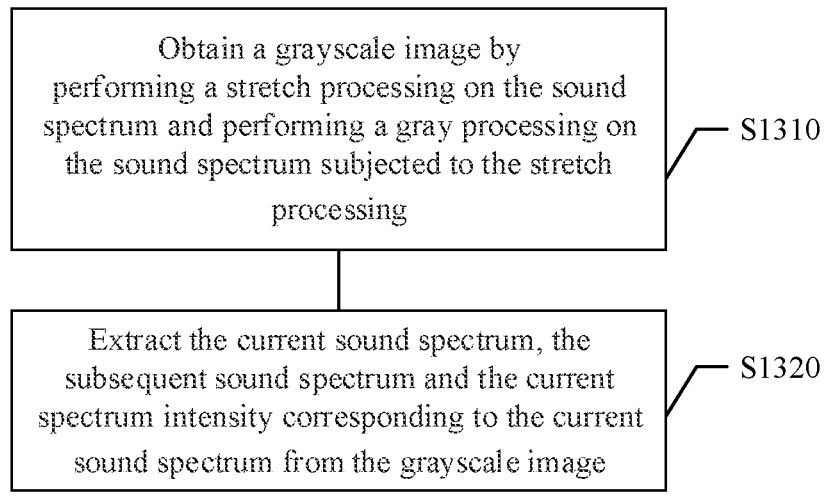
FIG. 13 schematically shows a schematic flowchart of a method for extracting sound spectrum information according to some embodiments of the present disclosure.
Figure 14:
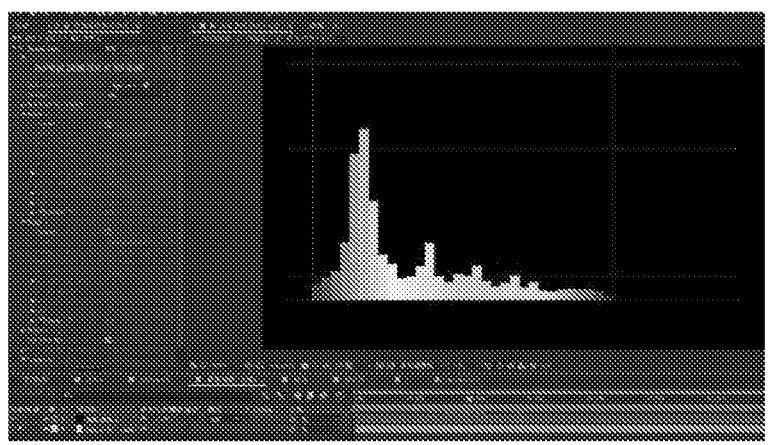
FIG. 14 schematically shows a schematic diagram of an interface for generating a sound spectrum according to some embodiments of the present disclosure.
Figure 15:
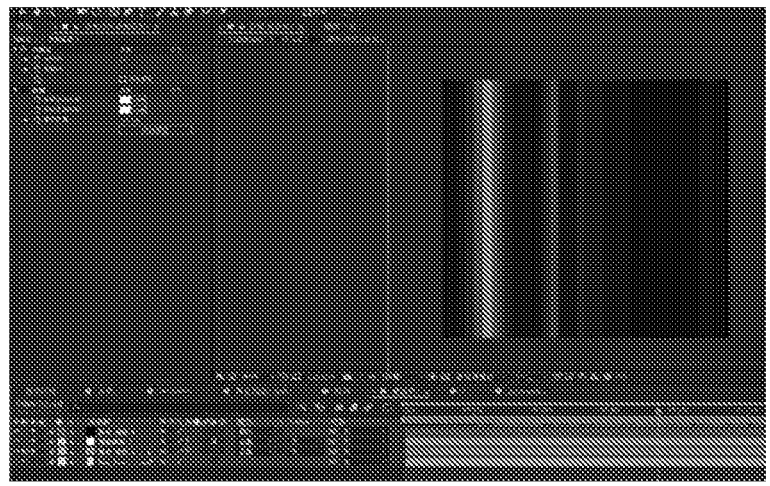
FIG. 15 schematically shows a schematic diagram of an interface of a spectrum histogram generated according to some embodiments of the present disclosure.

In some embodiments, FIG. 13 shows a schematic flowchart of a method for extracting sound spectrum information. As shown in FIG. 13, the method includes at least steps described below. In step S1310, a stretch processing is performed on the sound spectrum, and a gray processing is performed on the sound spectrum subjected to the stretch processing to obtain a grayscale image. The generation of the video file may be mainly realized by means of a software Adobe After Effects. FIG. 14 shows a schematic diagram of an interface for generating a sound spectrum. As shown in FIG. 14, the Trapcode Sound Keys audio track control in the software Adobe After Effects may be used for extracting an audio track in the audio data and converting it into the sound spectrum. Further, FIG. 15 shows a schematic diagram of an interface of a generated spectrum histogram. As shown in FIG. 15, after the stretch processing is performed on the sound spectrum, the gray processing is performed, and an intensity of each frequency in the spectrum is represented by a gray value, where 0 means the weakest and 1 means the strongest.

Figure 16:
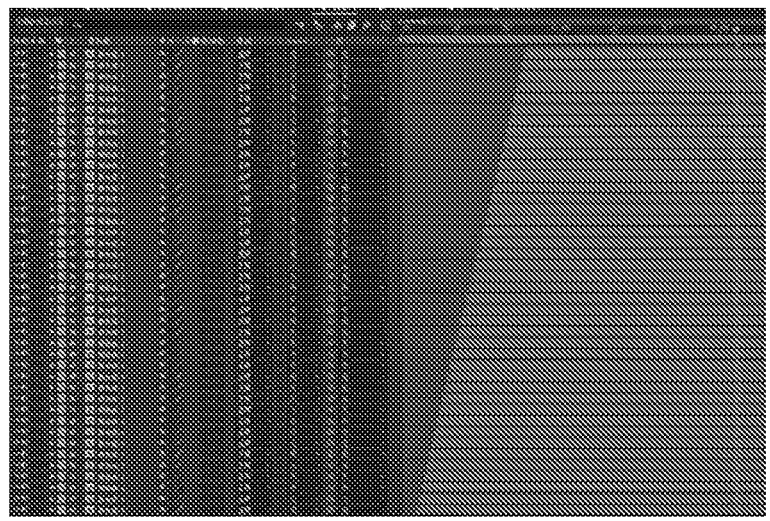
FIG. 16 schematically shows a schematic diagram of an interface of a frequency spectrum histogram of an audio track layer according to some embodiments of the present disclosure.

In step S1320, the current sound spectrum, the subsequent sound spectrum and the current spectrum intensity corresponding to the current sound spectrum are acquired from the grayscale image. FIG. 16 shows a schematic diagram of an interface of a spectrum histogram of an audio track layer. As shown in FIG. 16, the subsequent sound spectrum is processed in the same way as the method for generating the spectrum histogram in FIG. 15. Each spectrum is shifted by one row of pixels and processed in sequence by sixty-three times, and then the sound spectrum will cover images with 64 pixels*64 pixels. Since the A channel is not used and only three channels of R, G, and B are generally used when the sound spectrum information is saved as the video file, the current sound spectrum may be extracted directly from the spectrum histogram of the audio track layer to calculate the current spectrum intensity of the current sound spectrum, and the subsequent sound spectrum is extracted at the preset time interval.

In some embodiments, a method for extracting sound spectrum information is provided, which is highly targeted, simple and accurate, easy to operate, and extremely practical.

Figure 17:
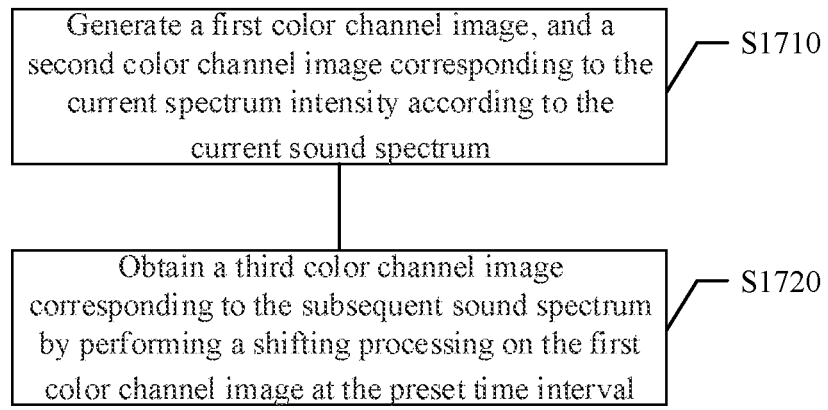
FIG. 17 schematically shows a schematic flowchart of a method for generating a color channel image according to some embodiments of the present disclosure.

In some embodiments, FIG. 17 shows a schematic flowchart of a method for generating a color channel image. As shown in FIG. 17, the method includes at least steps described below. In step S1710, a first color channel image, and a second color channel image corresponding to the current spectrum intensity are generated according to the current sound spectrum. The first color channel image may be a color channel image of the R channel, and the second color channel image may be a color channel image of the B channel.

Figure 18:
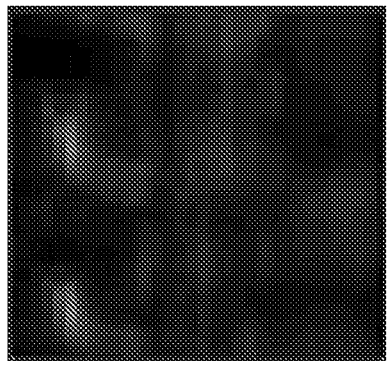
FIG. 18 schematically shows a generated first color channel image of a current sound spectrum according to some embodiments of the present disclosure.

Further, FIG. 18 shows a generated first color channel image of the current sound spectrum. As shown in FIG. 18, the current sound spectrum may be extracted from the spectrum histogram, and the current sound spectrum may be stored in the R channel.

Figure 19:
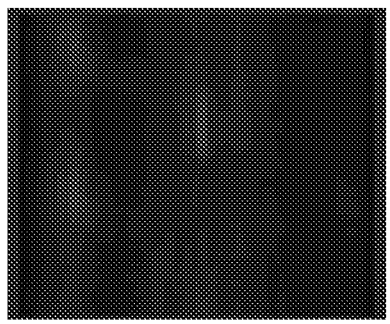
FIG. 19 schematically shows a generated second color channel image of a current spectrum intensity according to some embodiments of the present disclosure.

FIG. 19 shows a generated second color channel image of the current spectrum intensity. As shown in FIG. 19, for example, the color channel image of the R channel and the color channel image of the G channel are combined to obtain the second color channel image of the B channel. Further, an intensity of each frame of the second color channel image may be captured and saved as a value between 0 and 1 to obtain an optimized second color channel image.

In step S1720, a shifting processing is performed on the first color channel image at the preset time interval to obtain a third color channel image corresponding to the subsequent sound spectrum. The preset time interval may be measured by the length of time, or may be measured by the pixels under the change of the time length. Specifically, the second color channel image of the G channel may be obtained by shifting the pixels of the color channel image of the R channel forward by 64 rows.

In some embodiments, the corresponding color channel images may be generated through the relationship between the sound spectrum information, respectively, the correlation is close, the accuracy of the color channel image is high, and thus the generation effect of the game special effect is optimized.

After the first color channel image, the second color channel image, and the third color channel image are generated, these three may be combined and output as the video file.

In step S120, the sound spectrum information in the picture file or the video file is read.

In some embodiments of the present disclosure, when the sound spectrum information is stored in the picture file, a texture sampling technology may be used in the game to read the pre-calculated sound spectrum information in the picture file.

When the sound spectrum information is stored in the video file, the video file may be parsed in real time by a video decoding technology, and then an image of each parsed frame is read to read the pre-calculated sound spectrum information.

Figure 20:
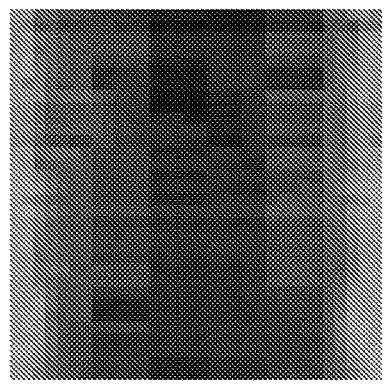
FIG. 20 schematically shows a schematic diagram of an interface for reading sound spectrum information according to some embodiments of the present disclosure.

Specifically, FIG. 20 shows a schematic diagram of an interface for reading sound spectrum information. As shown in FIG. 20, the picture file or the parsed video file is sampled in a moving window in the game to read the sound spectrum information. A size of the moving window may be 64 pixels*64 pixels, or other sizes, which is not particularly limited in this exemplary embodiment.

In step S130, the special effect animation in the game is generated according to the sound spectrum information.

In some embodiments of the present disclosure, the special effect animation in the game generated by the sound spectrum information may have two forms: a music waveform histogram and a music ring spectrogram, so as to visualize the music and the special effect animation changes with the changes of the music. In addition, other special effect animations may also be generated according to an actual game, which is not particularly limited in the embodiments.

Figure 21:
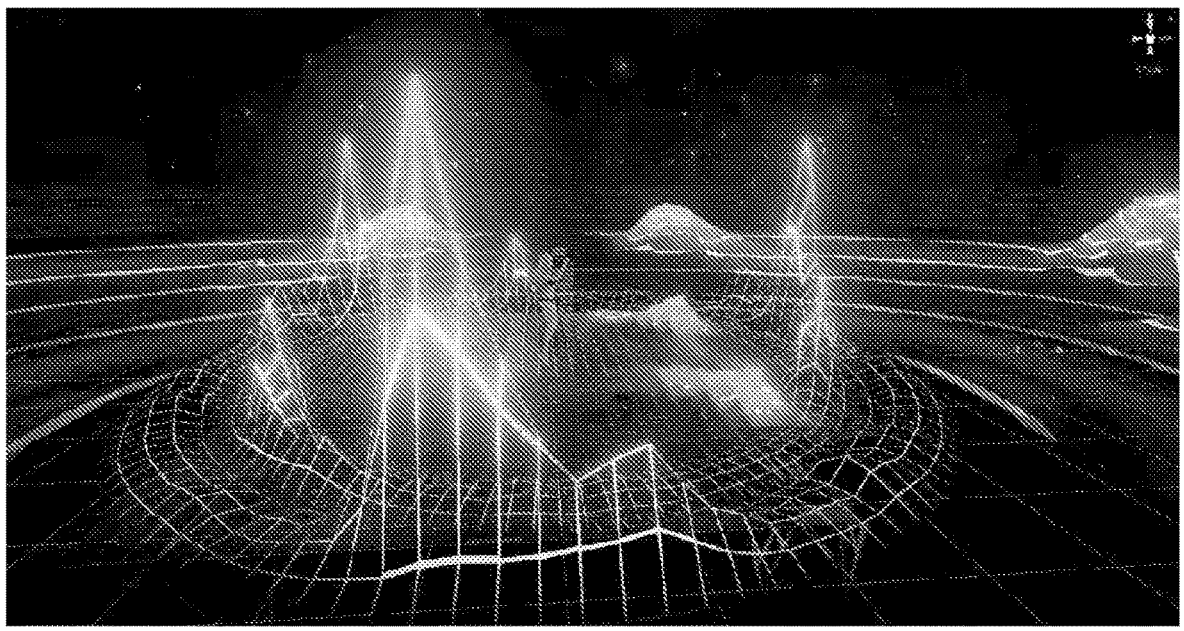
FIG. 21 schematically shows a special animation effect diagram of a music ring spectrogram according to some embodiments of the present disclosure.

FIG. 21 shows a special effect animation effect diagram of a music ring spectrogram. As shown in FIG. 21, different sound spectrum information due to the music correspondingly controls the vertex shift and the color change on the visual special effect model, which may achieve a visual effect of rich and flexible music. Nodes in a vertical direction of the music ring spectrogram indicate the intensity information of the sound; the halo is a ring effect drawn by the read sound spectrum information, and rotates from the start point to the end point; and the grid fluctuation indicates a coordination effect of rhythm and light effect.

In some embodiments of the present disclosure, the present disclosure may generate the special effect animation in the game through the sound spectrum information read from the picture file or the video file. On one hand, it solves a limitation that audio data cannot be analyzed and calculated in real time to obtain the sound spectrum information in a mobile platform, thereby achieving a purpose of accurately extracting the sound spectrum information on the basis of ensuring integrity of the audio data; on the other hand, the sound spectrum information is used to generate the games special effects, thereby enriching application scenarios of sound spectrum information and rendering more detailed and diverse three-dimensional special effect animations.

It should be noted that although various steps of the methods of the present disclosure are described in a particular order in the above exemplary embodiments, this does not imply that the steps must be performed in that particular order or that all of the steps shown must be performed to achieve a desired result. Additionally or alternatively, certain steps may be omitted, multiple steps may be combined into one step, and/or one step may be split into multiple steps, and so on.

Figure 22:
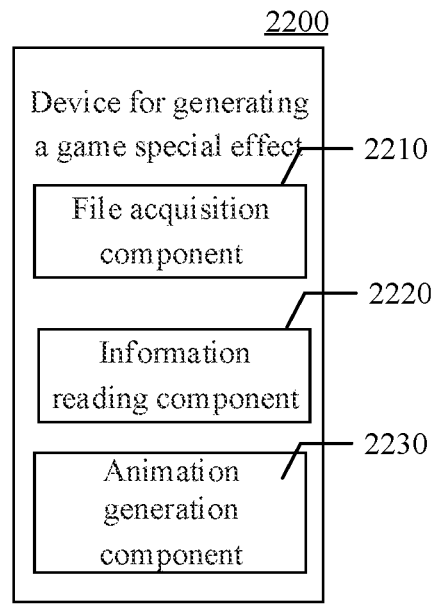
FIG. 22 schematically shows a schematic structural diagram of a device for generating a game special effect according to some embodiments of the present disclosure.

In addition, some embodiments of the present disclosure also provide a device for generating a game special effect. FIG. 22 shows a schematic structural diagram of the device. As shown in FIG. 22, the device 2200 for generating the game special effect may include: a file acquisition component 2210, an information reading component 2220, and an animation generation component 2230.

The file acquisition component 2210 is configured to acquire a picture file or a video file in response to a game running event, and sound spectrum information is stored in a color channel of the picture file or the video file. The information reading component 2220 is configured to read the sound spectrum information in the picture file or the video file. The animation generation component 2230 is configured to generate a special effect animation in the game according to the sound spectrum information.

Specific details of the above game special effect generation device have been described in detail in the corresponding method for generating a game special effect, so it will not be repeated here.

It should be noted that although several modules or units of the device 2200 are described above, such division is not mandatory. In fact, according to the embodiments of the present disclosure, the features and functions of two or more modules or units described above may be embodied in one module or unit. Conversely, the features and functions of a module or unit described above may be further divided into multiple modules or units.

Furthermore, although various steps of the methods of the present disclosure are described in a particular order in the drawings, this does not imply that the steps must be performed in that particular order or that all of the steps shown must be performed to achieve a desired result. Additionally or alternatively, certain steps may be omitted, multiple steps may be combined into one step, and/or one step may be split into multiple steps, and so on.

Through the description of the foregoing embodiments, those skilled in the art can easily understand that the embodiments described herein may be implemented by software, or by software in combination with necessary hardware. Therefore, the technical solutions according to the embodiments of the present disclosure may be embodied in the form of a software product, which may be stored in a non-volatile storage medium (which may be a CD-ROM, a U disk, a mobile hard disk, and so on) or on a network. The software product may include instructions to cause a computing device (which may be a personal computer, a server, a mobile terminal, or a network device, and so on) to perform methods according to embodiments of the present disclosure.

In addition, some embodiments of the present disclosure also provide an electronic device capable of implementing the above methods.

An electronic device 2300 according to some embodiments of the present disclosure is described below with reference to FIG. 23. The electronic device 2300 shown in FIG. 23 is only an example, and should not impose any limitation on the functions and scope of use of the embodiments of the present disclosure.

Figure 23:
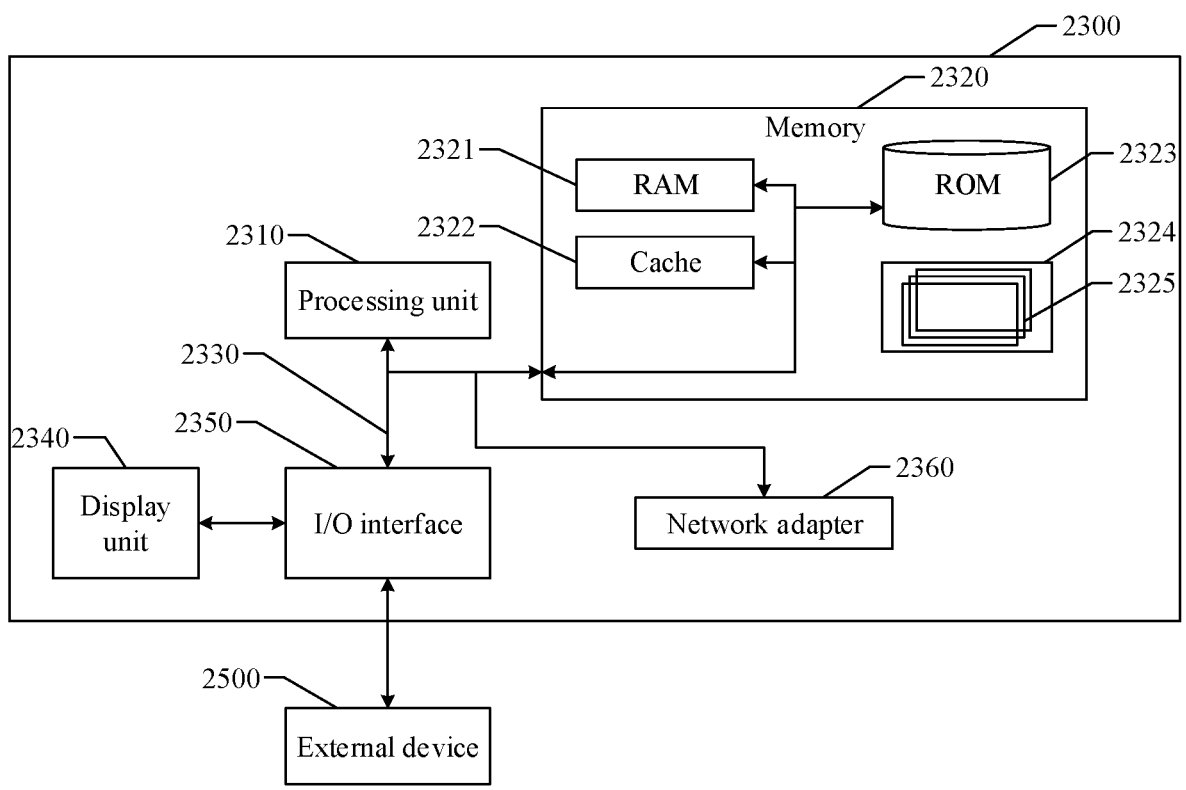
FIG. 23 schematically shows an electronic device for implementing a method for generating a game special effect according to some embodiments of the present disclosure.

As shown in FIG. 23, the electronic device 2300 is shown in the form of a general-purpose computing device. The components of the electronic device 2300 may include, but are not limited to, at least one processing unit 2310, at least one storage unit 2320, a bus 2330 connecting different system components (including the storage unit 2320 and the processing unit 2310), and a display unit 2340.

The storage unit stores program codes, and the program codes may be executed by the processing unit 2310, so that the processing unit 2310 executes various exemplary embodiments according to the present disclosure described in the "exemplary methods" section of the present specification.

The storage unit 2320 may include a readable medium in the form of a volatile storage unit, such as a random access storage unit (RAM) 2321 and/or a cache storage unit 2322, and may further include a read-only storage unit (ROM) 2323.

The storage unit 2320 may further include a program/utility tool 2324 having a set (at least one) of program modules 2325. Such program modules 2325 include, but are not limited to, an operating system, one or more application programs, other program modules, and program data. Each or some combination of these examples may include an implementation of a network environment.

The bus 2330 may be one or more of several types of bus structures, including a memory unit bus or a memory unit controller, a peripheral bus, a graphics acceleration port, a processing unit, or a local area bus using any bus structure in a variety of bus structures.

The electronic device 2300 may also communicate with one or more external devices 2500 (such as a keyboard, a pointing device, a Bluetooth device, etc.), and may also communicate with one or more devices that enable a user to interact with the electronic device 2300, and/or may also communicate with any device (such as a router, a modem) that can enable the electronic device 2300 to interact with one or more other computing devices. Such communication may be performed through an input/output (I/O) interface 2350. Moreover, the electronic device 2300 may also communicate with one or more networks (such as a local area network (LAN), a wide area network (WAN), and/or a public network, such as the Internet) through the network adapter 2360. As shown in the figure, the network adapter 2360 communicates with other modules of the electronic device 2300 through the bus 2330. It should be understood that although not shown in the figure, other hardware and/or software modules may be used in conjunction with the electronic device 2300, including but not limited to: microcode, device drivers, redundant processing units, external disk drive arrays, RAID systems, tape drives and data backup storage systems.

Through the description of the foregoing embodiments, those skilled in the art can easily understand that the example embodiments described herein may be implemented by software, or by software in combination with necessary hardware. Therefore, the technical solutions according to the embodiments of the present disclosure may be embodied in the form of a software product, and the software product may be stored in a non-volatile storage medium (which may be a CD-ROM, a U disk, a mobile hard disk, etc.) or on a network. The software product may include instructions to cause a computing device (which may be a personal computer, a server, a terminal device, or a network device, etc.) to execute the method according to exemplary embodiments of the present disclosure.

Some embodiments of the present disclosure also provide a computer-readable storage medium having stored thereon a program product capable of implementing the above methods according to embodiments of the present disclosure. In some possible implementations, aspects of the present disclosure may also be implemented in the form of a program product, which includes program codes. When the program product runs on a terminal device, the program codes are used to cause the terminal device to perform the steps according to various exemplary embodiments of the present disclosure described in the "exemplary methods" section of the present specification.

Figure 24:
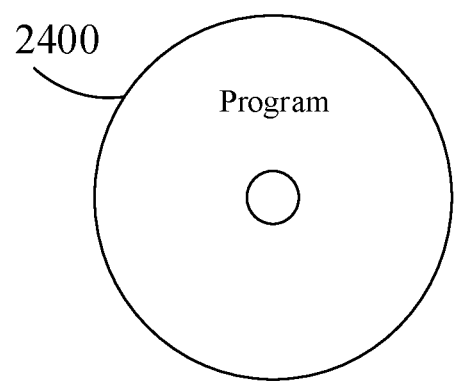
FIG. 24 schematically shows a computer-readable storage medium for implementing a method for generating a game special effect according to some embodiments of the present disclosure.

FIG. 24 shows a program product 2400 for implementing the above methods according to some embodiments of the present disclosure. The program product 2400 may be stored by a portable compact disc read-only memory (CD-ROM) and include program codes, and may be executed on a terminal device, such as a personal computer. However, the program product of the present disclosure is not limited thereto. The readable storage medium may be any tangible medium containing or storing a program, and the program may be used an instruction execution system, apparatus, or device, or the program may be used in combination with an instruction execution system, apparatus, or device.

The program product may employ any combination of one or more readable mediums. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive examples) of readable storage media include: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may include a data signal in baseband or propagated as part of a carrier wave, which carries readable program codes. Such a propagated data signal may have many forms, including but not limited to electromagnetic signals, optical signals, or any suitable combination of the foregoing. The readable signal medium may also be any readable medium other than a readable storage medium, and the readable medium may send, propagate, or transmit a program that is used by an instruction execution system, apparatus, or device, or that is used in combination with an instruction execution system, apparatus, or device.

The program codes contained on the readable medium may be transmitted using any appropriate medium, including but not limited to wireless, wired, optical fiber, RF, etc., or any suitable combination of the foregoing.

The program codes for performing the operations of the present disclosure may be written in any combination of one or more programming languages, which include object-oriented programming languages, such as Java, C++, and so on. The programming languages also include conventional procedural programming language, such as "C" or a similar programming language. The program codes may be executed entirely on the user computing device, may be executed partly on the user device, may be executed as an independent software package, may be executed partly on the user computing device and partly on a remote computing device, or may be executed entirely on the remote computing device or server. In the case of a remote computing device, the remote computing device may be connected to the user computing device through any kind of network, including a local area network (LAN) or a wide area network (WAN), or the remote computing device may be connected to an external computing device, for example, by the Internet provided by the Internet service providers.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

What is claimed is:

1. A method for generating a game special effect, comprising:
    acquiring a picture file or a video file in response to a game running event, wherein sound spectrum information is stored in a color channel of the picture file or the video file, and the sound spectrum information comprises a current sound spectrum, a current spectrum intensity, and a subsequent sound spectrum;
    reading the sound spectrum information in the picture file or the video file; and
    generating a special effect animation in the game according to the sound spectrum information.

2. The method according to claim 1, wherein the picture file or the video file is generated by:
    acquiring sound spectrums, and extracting, among the sound spectrums, the current sound spectrum, the subsequent sound spectrum and the current spectrum intensity corresponding to the current sound spectrum;
    generating color channel images that are in one-to-one correspondence with the current sound spectrum, the current spectrum intensity, and the subsequent sound spectrum, respectively; and
    generating a picture file or a video file corresponding to the sound spectrum by performing a fusion processing on the color channel images.

3. The method according to claim 2, wherein after generating color channel images that are in one-to-one correspondence with the current sound spectrum, the current spectrum intensity, and the subsequent sound spectrum, respectively, the method further comprises:
    extracting sound fluctuation information corresponding to the current sound spectrum at a preset time interval, and generating a color channel image corresponding to the sound fluctuation information.

4. The method according to claim 3, wherein the generating a picture file or a video file corresponding to the sound spectrum by performing a fusion processing on the color channel images, comprises:
    collecting a pixel value of each pixel point in the color channel images, respectively; and
    generating the picture file corresponding to the sound spectrum by performing a map processing on the pixel value and performing the fusion processing on the pixel value subjected to the map processing.

5. The method according to claim 4, wherein the map processing comprises a logarithmic processing and a normalization processing;
    the generating the picture file corresponding to the sound spectrum by performing a map processing on the pixel value and performing the fusion processing on the pixel value subjected to the map processing, comprises:
    obtaining image data corresponding to the color channel images by performing the logarithmic processing on the pixel value; and
    performing the normalization processing on the image data, and generating the picture file corresponding to the sound spectrum according to a result of the normalization processing.

6. The method according to claim 5, wherein the logarithmic processing comprises taking a logarithm of a calculation result related to a minimum or maximum value in the color channel image.

7. The method according to claim 6, wherein the normalization processing is performed on the image data by the following formula:

$$Y = \frac{\log_e(X - \min(X) + 1)}{\max(\log_e(X - \min(X) + 1))}$$

wherein, min(X) represents a minimum value among the pixel values, and max(X) represents a maximum value among the pixel values.

8. The method according to claim 4, wherein the picture file comprises a picture file in a format that supports opacity.

9. The method according to claim 8, wherein the file format is a portable network graphics.

10. The method according to claim 3, wherein the sound fluctuation information represents fluctuation of a certain frequency within a period since the current sound spectrum is extracted.

11. The method according to claim 2, wherein the acquiring sound spectrums comprises:
    obtaining a sound waveform graph by acquiring audio data and performing a sound visualization processing on the audio data; and
    converting the sound waveform graph into the sound spectrum through a short time Fourier transform.

12. The method according to claim 2, wherein the extracting, among the sound spectrums, the current sound spectrum, the subsequent sound spectrum and the current spectrum intensity corresponding to the current sound spectrum, comprises:
    obtaining a grayscale image by performing a stretch processing on the sound spectrum and performing a gray processing on the sound spectrum subjected to the stretch processing; and
    extracting the current sound spectrum, the subsequent sound spectrum and the current spectrum intensity corresponding to the current sound spectrum from the grayscale image.

13. The method according to claim 12, wherein the generating color channel images that are in one-to-one correspondence with the current sound spectrum, the current spectrum intensity, and the subsequent sound spectrum, respectively, comprises:
    generating a first color channel image, and a second color channel image corresponding to the current spectrum intensity according to the current sound spectrum; and obtaining a third color channel image corresponding to the subsequent sound spectrum by performing a shifting processing on the first color channel image at a preset time interval.

14. The method according to claim 1, wherein the game running event is a response event for generating a special effect animation in the game.

15. The method according to claim 1, wherein in response to determining that the sound spectrum information is stored in the picture file, the reading the sound spectrum information comprises: reading pre-calculated sound spectrum information in the picture file through texture sampling.

16. The method according to claim 1, wherein in response to determining that the sound spectrum information is stored in the video file, the reading the sound spectrum information comprises: reading pre-calculated sound spectrum information in the video file through parsing the video file in real time and reading an image of each parsed frame.

17. The method according to claim 1, wherein the special effect animation has two forms: a music waveform histogram and a music ring spectrogram.

18. A device for generating a game special effect, comprising:
a processor; and
a memory for storing instructions executable by the processor;
wherein the processor is arranged to execute operation of:
acquiring a picture file or a video file in response to a game running event, wherein sound spectrum information is stored in a color channel of the picture file or the video file, and the sound spectrum information comprises a current sound spectrum, a current spectrum intensity, and a subsequent sound spectrum;
reading the sound spectrum information in the picture file or the video file; and
generating a special effect animation in the game according to the sound spectrum information.

19. A non-transitory computer-readable storage medium having a computer program stored thereon, wherein the computer program, when executed by a processer, implements operations of:
acquiring a picture file or a video file in response to a game running event, wherein sound spectrum information is stored in a color channel of the picture file or the video file, and the sound spectrum information comprises a current sound spectrum, a current spectrum intensity, and a subsequent sound spectrum;
reading the sound spectrum information in the picture file or the video file; and
generating a special effect animation in the game according to the sound spectrum information.

* * * * *